(12) United States Patent
Russell et al.

(10) Patent No.: US 11,565,429 B2
(45) Date of Patent: Jan. 31, 2023

(54) GRASPING AFFORDANCE FOR USE IN A ROBOT SYSTEM

(71) Applicant: Ocado Innovation Limited, Hatfield (GB)

(72) Inventors: Duncan Russell, Hatfield (GB); Panagiotis Sotiropoulos, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 266 days.

(21) Appl. No.: 16/962,637

(22) PCT Filed: Jan. 16, 2019

(86) PCT No.: PCT/EP2019/051053
§ 371 (c)(1),
(2) Date: Jul. 16, 2020

(87) PCT Pub. No.: WO2019/141730
PCT Pub. Date: Jul. 25, 2019

(65) Prior Publication Data
US 2020/0353628 A1    Nov. 12, 2020

(30) Foreign Application Priority Data
Jan. 19, 2018   (GB) ..................... 1800863

(51) Int. Cl.
*B25J 15/06* (2006.01)
*B25J 11/00* (2006.01)
(Continued)

(52) U.S. Cl.
CPC ....... *B25J 15/0616* (2013.01); *B25J 11/0045* (2013.01); *B25J 15/008* (2013.01); *B25J 15/0028* (2013.01); *B25J 15/08* (2013.01)

(58) Field of Classification Search
CPC .. B25J 15/0616; B25J 15/0028; B25J 15/008; B25J 15/08; B25J 15/00; B25J 11/0045; B66C 1/42; B66C 1/66
See application file for complete search history.

(56) References Cited

U.S. PATENT DOCUMENTS 5,756,185 A    5/1998  Lesser
7,875,144 B2   1/2011  Kobayashi
(Continued)

FOREIGN PATENT DOCUMENTS

DE    102013009907 A1    12/2014
DE    102014012121 A1    3/2015
(Continued)

OTHER PUBLICATIONS

Office Action (Examination Report No. 1) dated Feb. 8, 2021, by the Australian Patent Office in corresponding Australian Patent Application No. 2019209501 (5 pages).
(Continued)

*Primary Examiner* — Stephen A Vu
(74) *Attorney, Agent, or Firm* — Buchanan Ingersoll & Rooney PC

(57) ABSTRACT

An affordance is disclosed which allows a robot system to pick an expanded range of items using a single type of end effector, without requiring the use of different end effectors. The affordance includes a first layer and a second layer. The first layer is arranged to be grasped by an end effector of the robot system and the second layer is arranged to adhere to the item. A system having an affordance and a robot system with an end effector arranged to grasp at least one item from storage by way of the affordance is also disclosed.

18 Claims, 5 Drawing Sheets

(51) Int. Cl.
*B25J 15/00* (2006.01)
*B25J 15/08* (2006.01)

(56) References Cited

U.S. PATENT DOCUMENTS

| | | | |
|---|---|---|---|
| 7,909,374 B2 | 3/2011 | Thallner | |
| 8,087,708 B2 | 1/2012 | Thallner | |
| 8,157,307 B2 | 4/2012 | Thallner | |
| 9,597,803 B2 | 3/2017 | Mimura et al. | |
| 9,704,126 B1 | 7/2017 | Wellman | |
| 10,059,007 B1* | 8/2018 | O'Connor | B25J 15/0028 |
| 10,137,580 B1* | 11/2018 | Cobb | B25J 19/0075 |
| 10,556,338 B1* | 2/2020 | Marchese | B25J 9/1612 |
| 11,007,643 B2 | 5/2021 | Diankov | |
| 2008/0008565 A1 | 1/2008 | Thallner | |
| 2008/0279659 A1 | 11/2008 | Kobayashi | |
| 2011/0127785 A1 | 6/2011 | Thallner | |
| 2011/0133500 A1 | 6/2011 | Thallner | |
| 2011/0193362 A1* | 8/2011 | Prahlad | B25J 15/00 294/81.2 |
| 2013/0242455 A1* | 9/2013 | Prahlad | B25J 15/0009 361/234 |
| 2014/0046486 A1 | 2/2014 | Mimura et al. | |
| 2017/0062263 A1* | 3/2017 | Kesil | H01L 21/67259 |
| 2020/0039073 A1 | 2/2020 | Diankov | |

FOREIGN PATENT DOCUMENTS

| | | |
|---|---|---|
| DE | 102015215973 A1 | 2/2017 |
| DE | 102016102232 A1 | 8/2017 |
| JP | S61166788 A | 7/1986 |
| JP | H04244393 A | 9/1992 |
| JP | 2003213102 A | 7/2003 |
| JP | 2008013372 A | 1/2008 |
| JP | 2008277688 A | 11/2008 |
| JP | 2014034075 A | 2/2014 |
| JP | 2015217439 A | 12/2015 |
| JP | 6258557 B1 | 1/2018 |
| WO | 2011100028 A1 | 8/2011 |

OTHER PUBLICATIONS

International Search Report (PCT/ISA/210) dated Apr. 16, 2019, by the European Patent Office as the International Searching Authority for International Application No. PCT/EP2019/051053.

Written Opinion (PCT/ISA/237) dated Apr. 16, 2019, by the European Patent Office as the International Searching Authority for International Application No. PCT/EP2019/051053.

Office Action (Examination Report No. 2) dated Oct. 29, 2021, by the Australian Patent Office in corresponding Australian Patent Application No. 2019209501 (3 pages).

First Office Action dated Aug. 31, 2021, by the Japanese Patent Office in corresponding Japanese Patent Application No. 2020-539796, and an English Translation of the Office Action. (11 pages).

Office Action dated Aug. 23, 2021, by the Canadian Patent Office in corresponding Canadian Patent Application No. 3,088,706. (5 pages).

Office Action dated Mar. 2, 2022, by the Canadian Patent Office in corresponding Canadian Patent Application No. 3,088,706. (4 pages).

* cited by examiner

GRASPING AFFORDANCE FOR USE IN A ROBOT SYSTEM

This application claims priority from UK Patent Application No. 1800863.1 filed 19 Jan. 2018, the content of all of this application hereby being incorporated by reference.

TECHNICAL FIELD

The present invention relates generally to the field of robotic picking and more specifically to an affordance for use on an item to be robotically picked.

BACKGROUND

In the field of robotic picking, items of varying size and weight are attempted to be picked by robot systems with end effectors of differing mechanisms. Two example mechanisms are suction cup end effectors and parallel jaw end effectors. Suction cup end effectors work by applying a mouth of a suction cup to the item to be picked and then drawing a vacuum inside the suction cup. Accordingly, atmospheric pressure ensures that the item to be picked remains attached to the mouth of the suction cup. Picking items with a suction cup end effector therefore requires a sufficient seal around the mouth of the suction cup to provide sufficient vacuum to withstand gravity and inertia whilst picking up and moving the item.

Parallel jaw end effectors comprise at least two jaws which are mechanically moveable. The jaws may start at a maximum distance apart and are arranged to reduce in distance to a minimum distance apart. Accordingly, to grip an item, the jaws may start at the maximum distance apart and then mechanically reduce the distance (for example using a screw mechanism) between each jaw until the jaws contact the item to be gripped. Thereby each jaw provides a force between the jaw and the item to grip the item. As will be appreciated, to work correctly the jaws must grip substantially parallel surfaces. For example, a two jaw end effector would have a poor grasp of an item without substantially parallel surfaces, such as a cone shaped item, because the jaws will slip on the surface due to poor surface contact. Moreover, if an item has dimensions larger than the maximum distance between the jaws then the parallel jaw end effector is unable to grip the item.

When a range of items to be picked some items will be unable to be picked by certain end effectors. For example, a sponge could not usually be picked by a suction cup end effector, even though the weight of the sponge is less than the maximum weight lifting capacity of the suction cup end effector, because a vacuum seal between the sponge and the suction end effector is not sufficient enough to achieve a grasp of the item.

Accordingly, items which could potentially be picked using a suction cup end effector are currently not considered for picking this way because they do not offer the necessary surface features. It is therefore necessary to limit the range of items that a robot system can pick thereby constraining its use to a small range of items that can be picked.

Similarly, there are items which cannot be picked by a parallel jaw end effector, even though the item's weight is less than the maximum lifting capacity of a parallel jaw end effector, because the items do not feature substantially parallel surfaces for the parallel jaw end effector to successfully grasp and/or the dimensions of the item are greater than the maximum distance between the jaws of the parallel jaw end effector. Therefore, it is necessary to limit the items that can be successfully picked by the parallel jaw end effector.

Therefore, a limited range of items can be picked by each of the example end effectors, even though the weight of an item may be within the weight lifting capacity of a particular end effector.

SUMMARY

In view of the problems in robotic picking systems, the present invention aims to provide an affordance which allows a robot system to pick an expanded range of items using a single type of end effector, without requiring the use of different end effectors.

In general terms, the invention introduces an artificial affordance to be applied to items not usually suitable to be picked by a particular type of end effector. The artificial affordance, when applied to an item, makes the item suitable for robotic picking by the particular type of end effector.

According to the present invention there is provided an affordance for an item to be grasped by a robot system, the robot system comprising an end effector. The affordance comprises a first layer and a second layer. The first layer is arranged to be grasped by the end effector and the second layer is arranged to adhere to the item.

The present invention also provides a system comprising an affordance as described previously and a robot system comprising an end effector arranged to grasp at least one item from at least one storage means by way of the affordance.

The present invention also provides an order fulfilment system comprising a storage means arranged to store at least one item and a system as previously described wherein the robot system is arranged to grasp at least one item from the storage means by way of the affordance.

The present invention also provides a method comprising the steps of applying to an item an affordance comprising a first layer arranged to be grasped by an end effector of a robot system, and a second layer arranged to adhere to the item, and grasping, by the end effector of the robot system, the item by way of the affordance.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 1:
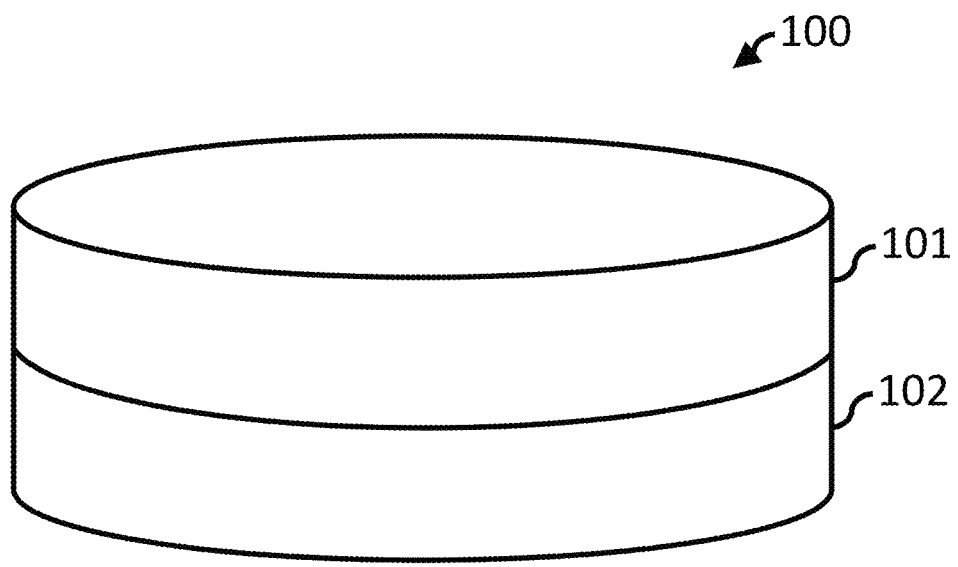
FIG. 1 is a schematic diagram of one non-limiting example of an affordance according to a first embodiment of the present invention.

FIG. 1 depicts a non-limiting example of an affordance 100 according to a first embodiment of the present invention. The affordance is suitable to be applied to an item to be grasped by an end effector of a robot system. The affordance 100 comprises two layers.

The first layer 101 is arranged to be grasped by the end effector. In the example shown in FIG. 1 the first layer 101 is suitable for grasping by a suction cup end effector. As depicted, the first layer 101 provides a surface which ensures that the suction cup end effector can create and maintain a sufficient seal on the surface of the first layer 101 to ensure an appropriate vacuum level is maintained to successfully grasp the first layer 101. If the item to be robotically picked is relatively rigid then the affordance (which may be a flexible affordance) can simply be applied and robotic picking can thereby be successfully achieved. However, if the item is relatively flexible then the first layer 101 may comprise a semi-rigid or rigid material so that it maintains its shape sufficiently under action of the end effector to permit successful robotic picking. For example, under action of the suction cup end effector that the first layer 101 does not deform so much to break the vacuum seal thereby failing to achieve grasping of the item.

The affordance 100 depicted in FIG. 1 is specifically arranged for use with a suction cup end effector. In particular, the first layer 101 is depicted with a top surface being circular in shape to thereby match the shape of the end of the suction cup end effector. Moreover, the first layer 101 has a radius larger than the suction cup end effector thereby providing a surface adapted for use by a suction cup end effector. However, the shape of the affordance 100 may be any shape such as triangular, square, rectangular, pentagonal etc. but with a minimum size which will fully accommodate the mouth of a suction cup end effector with an adequate vacuum seal. In other words, the entire mouth of the suction cup end effector must be in contact with the first layer 101 of the affordance 100.

For example, if the item to be picked has a rough surface with undulations then achieving a vacuum seal will be difficult. However, by applying the affordance 100 to the surface then a suitable surface for vacuum sealing is provided. To achieve this, in one example, the first layer 101 is flatter and/or smoother than the item to be picked, in other words smoothing out the otherwise rough surface of the item. In this way, under action of the suction cup end effector, a better vacuum seal is achieved by the suction cup end effector using the affordance 100 than without the affordance 100.

The second layer 102 is arranged to adhere to the item. For example, the second layer 102 may comprise an adhesive and/or a hoop and loop fastener (for example, Velcro). In this way, the second layer 102 successfully attaches to the surface of the item to be picked with a sufficient force to ensure that the entire item, as well as the affordance 100, can be successfully picked by the robot system. For example, if the item to be picked is a netting material such as typically used to contain lemons in supermarkets then the present inventors have found a hook part of hook and loop fasteners (such as Velcro) to be effective at adhering to the netting with sufficient force to permit robotic picking. Additionally or alternatively, if the item has an outer layer of plastic such as a plastic wrapped food item, then the present inventors have found that adhesive materials are suitable for use in the second layer 102. As will be appreciated, a number of different adhesives are suitable for use in the second layer 102 and will be selected to have the best adherence to an outer packaging layer of an item to be robotically picked. Indeed, the present inventors envisage that a number of different affordances 100 may be produced with different adhesives in the second layer 102 each suited for different outer packaging coatings of differing compositions and may be applied to respective items upon which the affordance 100 will have a suitable adhesion. In this way, the second layer 102 provides an adhering force which is greater than the force of gravity and inertia applied to the item during grasping and moving by the robot system.

Accordingly, items which could not usually be picked by a suction cup end effector, such as porous items and/or items with rough surfaces are able to be grasped by a suction cup end effector by way of the affordance 100.

In a preferred embodiment, the second layer 102 is food-safe, in other words contains no elements toxic to human/animal/plant life because, in the case of picking grocery items, the second layer 102 may be in contact with a food item.

Preferably, the second layer 102 adheres to the item within a relatively short amount of time, for example ten seconds. In this way, the time between applying the affordance 100 and the time at which the item can robotically picked is minimised.

Figure 2:
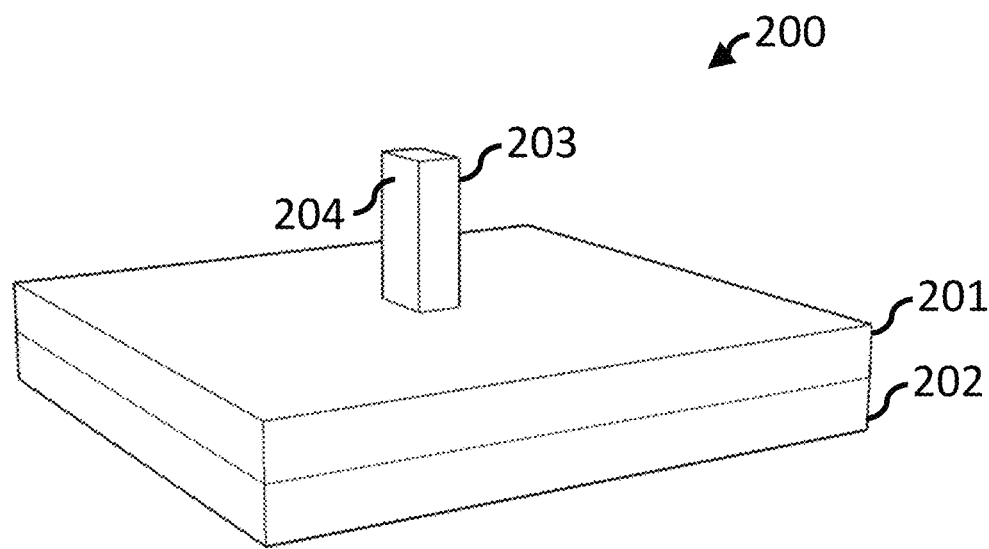
FIG. 2 is a schematic diagram of another non-limiting example of an affordance according to the first embodiment of the present invention.

FIG. 2 depicts another non-limiting example of an affordance 200 according to a first embodiment of the present invention. As shown in FIG. 2, the affordance 200 comprises the two layers disclosed with regard to FIG. 1, namely the first layer 201 and the second layer 202. As disclosed previously, the first layer 201 is arranged to be grasped by the end effector of the robot system and the second layer is arranged to adhere to the item. In this example, the first layer 201 is shown to have a rectangular shape, however, this is by way of example and any number of different shapes such as triangular, square, circular, pentagonal etc.

In this non-limiting example, the affordance 200 is specifically arranged to be grasped by a parallel jaw end effector. To achieve this, the first layer 201 comprises a structure 203 arranged to be grasped by the parallel jaw end effector. In one example, the structure 203 comprises two substantially parallel surfaces. In particular, parallel jaw end effectors operate by grasping substantially parallel surfaces of an item between jaws. This may be difficult to achieve if the item has outer surfaces which are not substantially parallel such as spherical items or uneven items with varying profiles such as cones. Moreover, for items with dimensions larger than the maximum distance possible between the jaws of the parallel jaw end effector then parallel jaw end effectors will be unable to grasp the item.

Therefore, the affordance 200 shown in FIG. 2 comprises the structure 203 which provides at least two surfaces substantially parallel separated by a distance which is less than the maximum distance between the jaws of a parallel jaw end effector. Therefore, the first layer 201 provides a structure 203 which is easily grasped by a parallel jaw end effector. Moreover, structure 203 may comprise at least one surface 204 which is a relatively higher surface friction than other surfaces of the structure 203. In this way, the surface 204 may be gripped by the parallel jaw end effector and more successfully grip the surface due to the higher level of surface fiction than other surfaces. For example, the at least two surfaces which are substantially parallel may comprise a material which is of a relatively higher surface friction than the other surfaces of the structure 203. In this way, when the parallel jaw end effector grips the surface 204 a reduced chance of slip of the parallel jaw end effector is achieved.

Advantageously, the first layer 201 including the structure 203 may be formed of a semi-rigid or rigid material. In this way, the structure 203 maintains its shape sufficiently to be successfully gripped by the parallel jaw end effector, irrespective of whether the item to be robotically picked is flexible or not. In this way, the structure 203 does not overly deform under the force of the parallel jaw end effector so that the parallel jaw end effector maintains a sufficient gripping force for the item to be robotically picked.

With respect to the second layer 202 shown in FIG. 2, this layer is generally identical to the second layer 102 as explained previously except that the second layer 202 is shaped to match the rectangular shape of the first layer 201. More specifically, the second layer 202 is arranged to adhere to the item. Typically, this is achieved by way of an adhesive, which preferably is food-safe. However, other adhesion techniques are available, such as utilising a series of hooks (such as employed in typical hook and loop fasteners) which adhere well to netting materials. As previously disclosed, preferably the second layer 202 adheres to the surface of the item in a relatively short amount of time, for example, ten seconds, so that the delay between applying the affordance 200 and commencing the robotic picking can be minimised. In this way, the affordance 200 shown in FIG. 2 adheres to the item so that the structure 203 can be grasped by the parallel jaw end effector.

Although the affordance 200 is arranged to be grasped by the parallel jaw end effector, the present inventors envisage that an affordance may be equally compatible with both of a suction cup end effector and a parallel jaw end effector. To achieve this, the first layer 201 is provided to be large enough to fully accommodate a suction cup end effector to ensure a sufficient vacuum seal. Moreover, a structure 203 is provided small enough to enter the mouth of a suction cup end effector and not block the air passage (used to draw a vacuum) whilst also being large enough to effectively be grasped by the parallel jaw end effector. Accordingly, the present inventors envisage the affordance 200, when properly sized, to be an affordance which is able to operate interchangeably with both the suction cup and parallel jaw end effectors.

Figure 3:
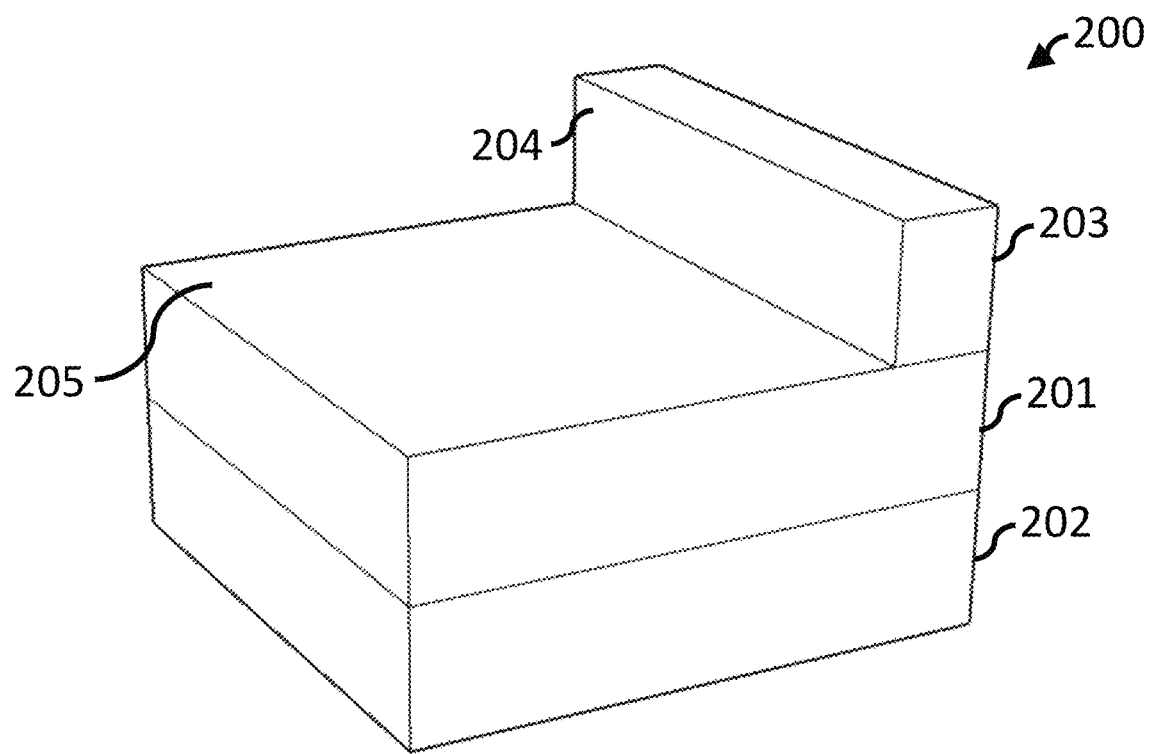
FIG. 3 is a schematic diagram of another non-limiting example of an affordance according to the first embodiment of the present invention.

FIG. 3 shows another example of the affordance 200 shown in FIG. 2. In this example, the affordance 200 is shown with the same reference signs as the affordance 200 shown in FIG. 2. This particular affordance is shown to highlight features which makes the affordance 200 compatible with both a suction cup end effector and a parallel jaw end effector. In particular, the first layer 201 comprises a relatively large, flat and smooth area 205 which provides an area to be gripped by a suction cup end effector. Moreover, a structure 203 is provided which may be gripped by a parallel jaw end effector.

Accordingly, the first layer 201 provides features which allow both of a suction cup end effector and/or a parallel jaw end effector to successfully grip the affordance 200.

Moreover, the structure 203 may comprise at least one surface 204 comprising a higher level of surface friction that other surfaces. In this way, when the parallel jaw end effector grips the structure 203 by way of the at least one surface 204 a better grip is achieved with a lower risk of slip in the jaws of the parallel jaw end effector.

Figure 4:
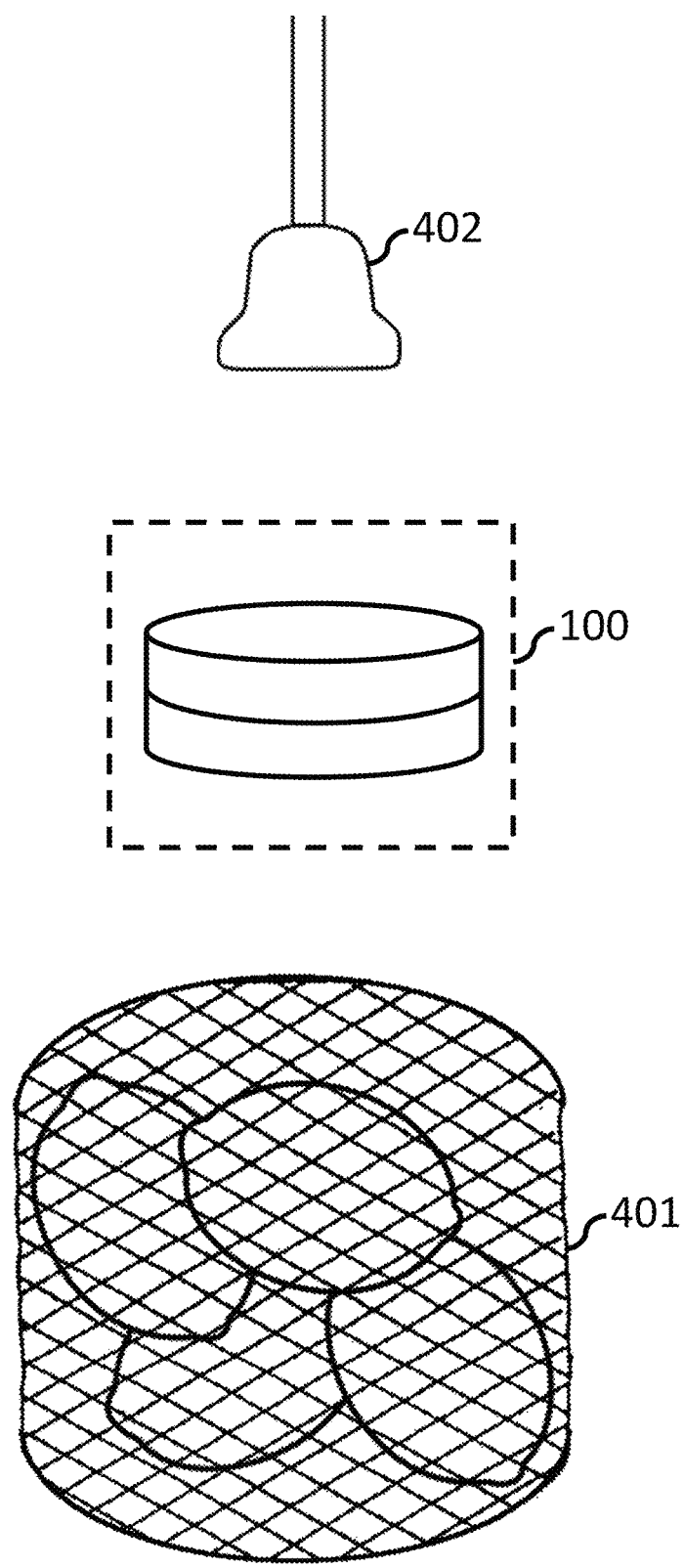
FIG. 4 is a schematic diagram showing the adhering of the affordance shown in FIG. 1 to a first item.

FIG. 4 depicts one example of applying the affordance 100 shown in FIG. 1 to an item 401 and then robotically picking the item 401 by way of a suction cup end effector 402. The item 401 in this example is a net bag filled with lemons which is a typical grocery item which is envisaged by the present inventors to be robotically picked. As will be appreciated, the types of items which may be robotically picked by the application of the affordance 100 is greatly increased with respect to robotic picking without the affordance 100.

More specifically, a robot system utilising a suction cup end effector 402 is usually limited to only picking a limited range of items where the items provide a surface suitable for use by a suction cup end effector 402. Typically the surface must be suitable for the suction cup end effector to form a vacuum seal which typically requires relatively smooth and relatively flat surfaces. Moreover, the surface must have a minimum radius at least as large as the radius of the suction cup end effector to ensure a vacuum seal is achieved around the mouth of the suction cup end effector 402. For a company offering a range of products of which 70% provide relatively smooth and relatively flat surfaces then it would be natural to select a suction cup end effector in a robot system to thereby easily robotically pick most of the range of items used by the company. However, item 401 lies in the 30% of items of the company for which a suction cup end effector will not work due to uneven surfaces of the item 401. The present inventors, by applying an affordance 100 to the net bag, thereby provide a means to robotically pick items which otherwise could not be robotically picked by a particular end effector. In this way, the range of items robotically picked can be successfully increased thereby reducing the time, cost and complexity required in picking these items.

With reference to FIG. 4, the affordance 100 is applied to item 401 by way of the second layer 102. In this example, a series of hooks from a hook and loop fastener may be used because the hooks adhere to the net bag. Alternatively or additionally, an adhesive may be used to bond the affordance 100 to the netting of the item 401. In this way, the affordance 100 adheres to the surface of the item 401 with a force greater than the force of gravity and inertia applied during moving of the item 401.

Moreover, the surface of the item 401 is relatively flexible, accordingly, with a flexible affordance 100 it may prove difficult to achieve a sufficient vacuum seal with the suction cup end effector 402. Therefore, in a preferred embodiment, the first layer 101 of the affordance 100 may comprise a semi-rigid or rigid material so that it maintains its shape sufficiently under action of the end effector to permit successful robotic picking.

Once the affordance 100 has adhered to the item 401 then the suction cup end effector 402 is able to form a vacuum seal on the first layer 101 of the affordance 100. In particular, the surface of the first layer 101 is such that the suction cup end effector 402 is able to form a vacuum seal because the surface of the first layer 101 is smoother and/or flatter than the netting of the item 401. Accordingly, the suction cup end effector is able to thereby robotically pick the item 401.

Figure 5:
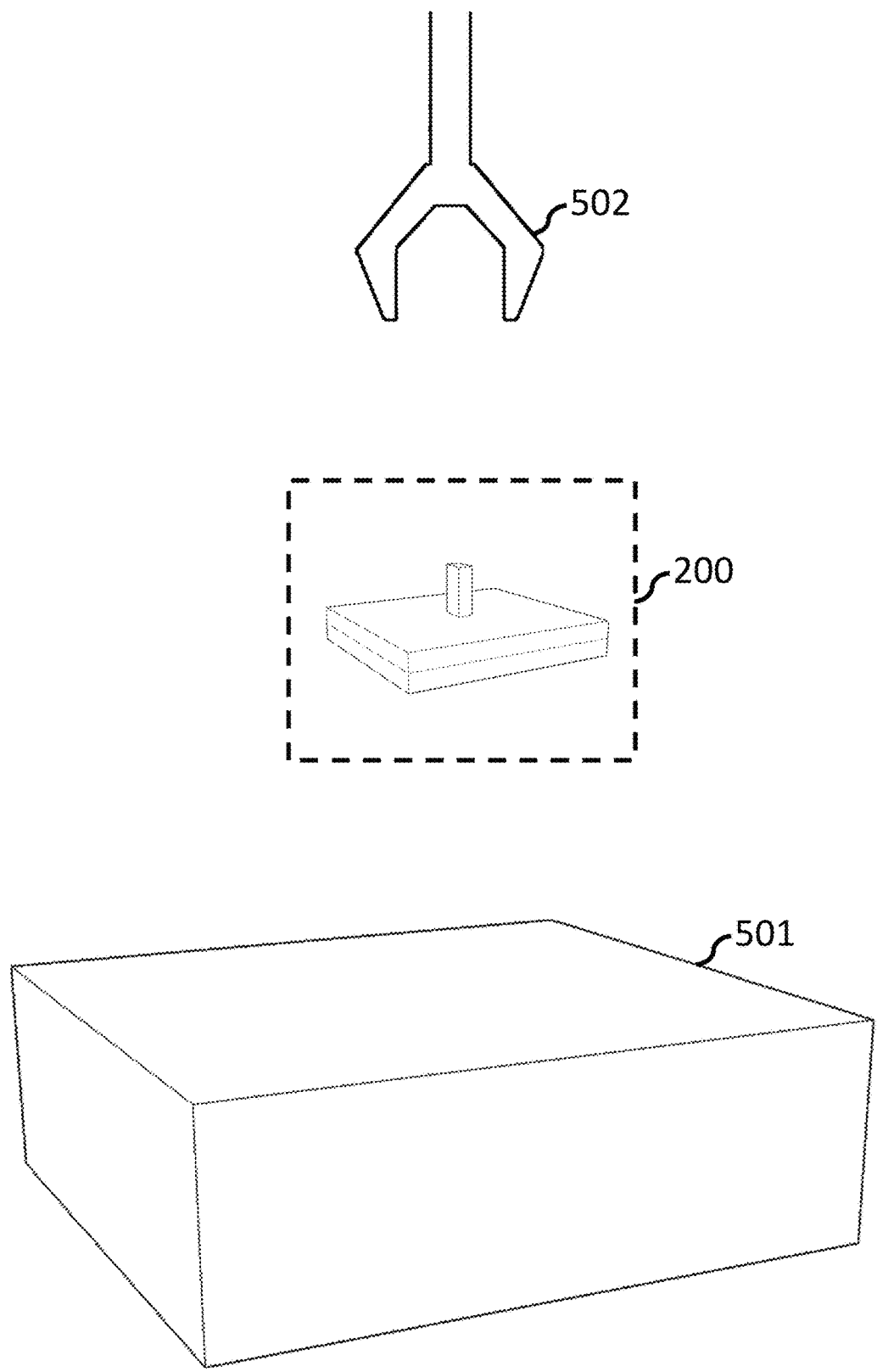
FIG. 5 is a schematic diagram showing the adhering of the affordance shown in FIG. 2 to a second item.

FIG. 5 depicts another example of applying the affordance 200 shown in FIG. 2 to an item 501 and then robotically picking the item 501 by way of a parallel jaw end effector 502. The item 501 in this example is a cardboard box, the dimensions of which exceed the maximum distance between the jaws of the parallel jaw end effector in all three dimensions. As will be appreciated, the types of items which may be robotically picked by the application of the affordance 200 is greatly increased with respect to robotic picking without the affordance 200.

More specifically, a robot system utilising parallel jaw end effector 502 is usually limited to only picking a limited range of items where the items provide surfaces suitable for use by a parallel jaw end effector 502. Typically the item must provide at least two surfaces which are substantially parallel for the parallel jaw end effector to form a grip on the item without slipping. Moreover, the item must comprise at least one dimension whose distance between two substantially parallel surfaces is less than the maximum distance between the parallel jaw end effector when at maximum extension. In the example shown in FIG. 5, no such dimension exists and so the item 501 cannot be picked by a parallel jaw end effector 502. For a company offering a range of products of which 70% provide items which would fit between the jaws of a parallel jaw end effector and whose surfaces are substantially parallel it would be natural to select a parallel jaw end effector in a robot system to thereby easily robotically pick most of the range of items used by the company. However, the item 501 lies in the 30% of items of the company that are unable to be picked by a parallel jaw end effector. The present inventors, by applying an affordance 200 to the item 501 thereby provide a means to robotically pick items which otherwise could not be robotically picked by a particular end effector. In this way, the range of items robotically picked can be successfully increased thereby reducing the time, cost and complexity required in picking these items.

With reference to FIG. 5, the affordance 200 is applied to item 501 by way of the second layer 202. In this example, an adhesive may be used to bond the affordance 200 to the cardboard of the item 501. In this way, the affordance 200 adheres to the surface of the item 501 with a force greater than the force of gravity and inertia applied during moving of the item 501.

Once the affordance 200 has adhered to the item 501 then the parallel jaw end effector 502 is able to form a grasp the structure 203 on the first layer 201 of the affordance 200. In particular, the structure 203 of the first layer 201 provides at least two parallel surfaces spaced a distance apart which is less than the maximum distance of the parallel jaw end effector so that the parallel jaw end effector 502 is able to grasp the structure 203. Accordingly, the parallel jaw end effector is able to thereby robotically pick the item 501.

The affordances 100 and 200 thereby provide a low cost and low impact solution that significantly extends the range of the items to be robotically picked by a specific end effector. This allows a wider/expanded range of items to be picked at the same picking location.

Figure 6:
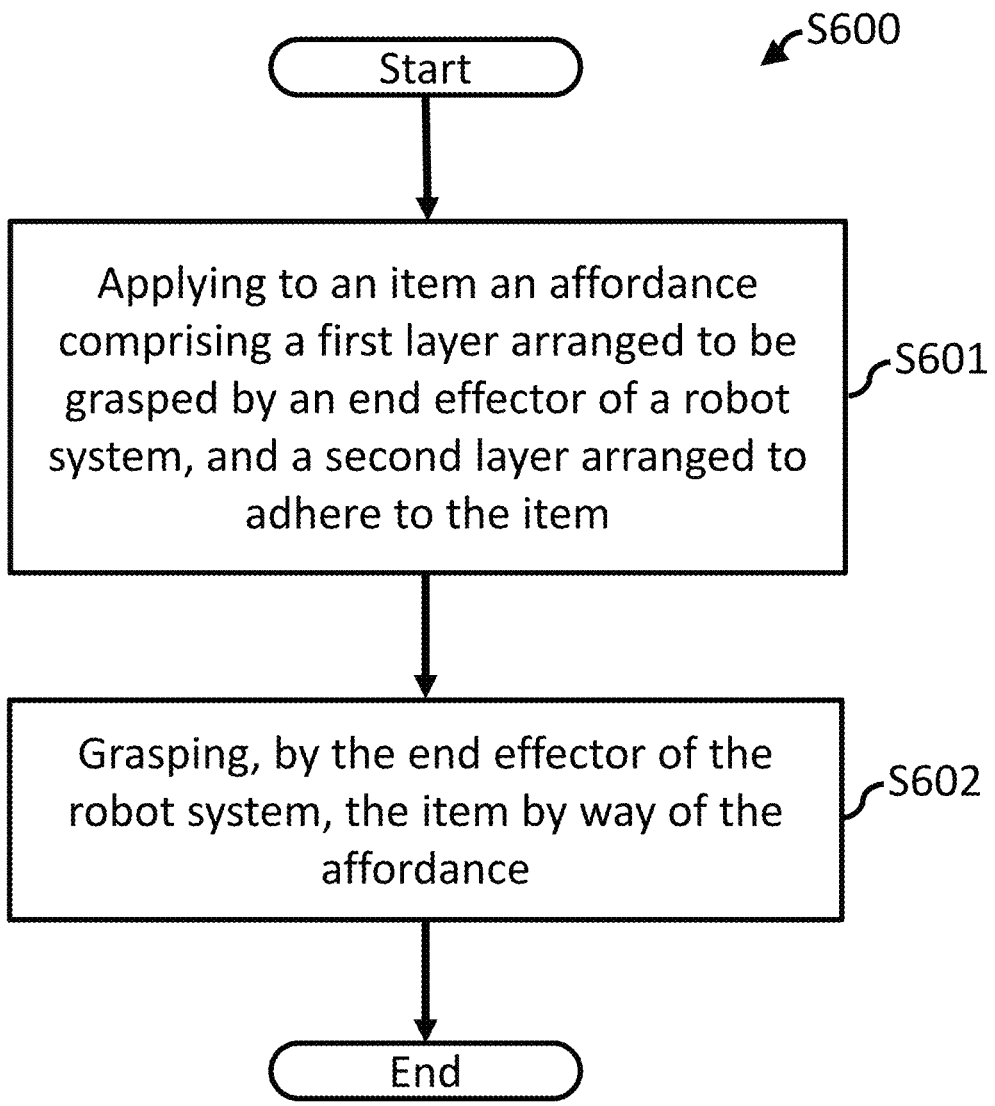
FIG. 6 is a flowchart of the method steps performed to adhere an affordance to an item and then to robotically pick the item.

FIG. 6 shows a method of using an affordance according to the first embodiment of the present invention. The method S600 comprises two steps, an applying step S601 and a grasping step S602.

At step S601 an affordance, as described previously, is applied to an item. In this embodiment the affordance comprises two layers, the first layer is arranged to be grasped by an end effector of a robot system and the second layer is arranged to adhere to the item.

As described previously, the first layer is arranged to be grasped by many different types of end effectors, such as but not limited to suction cup end effectors or parallel jaw end effectors. To this end, the first layer provides the features necessary to ensure that the end effector achieve a sufficient grasp of the first layer to permit robotic picking. For example, with respect to the suction cup end effector this entails ensuring a sufficient vacuum seal is achieved around the mouth of the suction cup end effector. With respect to the parallel jaw end effector, this entails providing surfaces on the first layer (for example, using the structure described previously) which are easily grasped by the parallel jaw end effector.

The second layer is arranged to adhere to the surface of the item to be robotically picked. To this end, the second layer may comprise an adhesive, hooks or any other means to achieve a sufficient bond between the second layer and the item to be picked. To this end, the present inventors have found that a curing time of the second layer of less than ten seconds minimises the time between applying the affordance and grasping the affordance. Ideally the second layer is food-safe so that it may be used with food items.

The applying step S601 may be achieved in any number of ways. For example, the affordances may be manually applied by workers. Alternatively, the affordances may be applied by mechanical means arranged to apply to affordances to the items to be robotically picked.

At step S602, the item upon which the affordance has been applied is grasped by the end effector of the robot system. To grasp the affordance, the robot system identifies the affordance on the surface of the item. This may achieved by a worker manually positioning the end effector or alternatively automatic means, such as vision systems, may identify the affordance and automatically align the end effector with the affordance. Next, the end effector is brought into contact with the affordance and finally the end effector is caused to grasp the affordance. Once grasping has been achieved the robot system may move the end effector, along with the affordance and the item to a position as required.

In the example of suction cup end effectors, grasping is achieved by drawing a vacuum at the suction cup so that atmospheric pressure maintains the item against the suction cup. For the parallel jaw end effector the jaws are brought into contact with surface of the affordance until a sufficient force is generated between the affordance and the jaws to permit robotic picking.

In this way, the range of items for which robotic picking may be achieved is increased.

Modifications and Variations

Many modifications and variations can be made to the embodiments described above, without departing from the scope of the present invention.

In a preferable embodiment, the affordance 100 and 200 is formed of bio-degradable materials so as reduce the environmental impact of used affordances.

The present description is not limited to a particular size of end effector. Typically, as the size of the end effector increases so does the weight lifting capacity of the end effector. In other words, the embodiments of the present invention apply to items of a very small weight, such as integrated circuits to items of a large weight such as automobiles. The affordance disclosed previously may equally be applied to items across a range of sizes and weights.

Although the above description discloses a suction cup end effector and a parallel jaw end effector, the present inventors envisage a number of other end effectors may be applied to the first embodiment of the invention. For example, although the parallel jaw end effector has typically been described with two parallel jaws, this type of end effector would work equally well with at least two jaws. For example, three jaws may be employed. Additionally, as the number of jaws increases the gripping force of the end effector may increase such that an increase in the weight lifting capacity of the parallel jaw end effector also increases. In this example, it is assumed that each additionally jaw is included parallel to at least another jaw of the parallel jaw end effector. For example, a four jaw parallel jaw end effector may include a first set of two co-planar jaws and a second set of two co-planar jaws but spaced apart from the first set of jaws. In this way additionally weight may be lifted by the parallel jaws end effectors. Moreover, the number of substantially parallel surfaces of the structure 203 need not increase because each of the jaws within a set of jaws is co-planar and hence can still successfully grip the two substantially parallel surfaces of the structure 203. In a further example, jaws need not be used but rather fingers may be employed which are typically more articulated than jaws of a parallel jaw end effector.

The present inventors also envisage concentric jaw end effectors as another example of an end effector. In this example the jaws are concentrically arranged around a central point of the end effector. For example, a three jaw concentric jaw end effector may have jaws spaced substantially 120 degrees apart around the centre of concentric jaw end effector. Such an end effector may require a modification to the structure 203 to accommodate the extra jaws and still provide surfaces which can be successfully gripped by the three jaw concentric jaw end effector. For example, the structure 203 may comprise a triangular profile with three surfaces each angled substantially 60 degrees from each other to form an equilateral triangle. As the number of jaws increase then the number of surfaces on the structure 203 will also increase. For example, with four jaws, the structure 203 may comprise four surfaces formed in a square profile with each surface angled substantially 90 degrees apart. In other words, the surfaces of the structure 203 are angled such that the jaws of the concentric jaw end effector successfully grasp the structure 203. In a further example, jaws need not be used but rather fingers may be employed which are typically more articulated than jaws of a parallel jaw end effector.

Similarly, an end effector comprising at least two suction cup end effectors may be employed to thereby lift more weight than a single suction cup end effector. To this end the first layer 101 and 201 may comprise a larger area or multiple smaller areas to as to provides surfaces against which each suction cup of the at least two suction cups can form a vacuum seal. In a further example, jaws need not be used but rather fingers which are typically more articulated than jaws of a parallel jaw end effector.

In another non-limiting example the end effector may comprise electroadhesion means such as an electrostatic end effector to grasp an item utilising electrostatics. In this sense, the first layer 101 and 201 may comprise materials suitable to be grasped by an electrostatic end effector. Materials such as plastics and other electrically non-conductive materials may work best with electrostatic end effectors.

In another non-limiting example the end effector may utilise electromagnetic means such as an electromagnet to grasp an item. In this sense, the first layer 101 and 201 may comprise materials suitable to be grasped by an electromagnetic end effector. Materials such as ferrous metals, for example, iron, nickel and cobalt, may work best with electromagnetic end effectors.

Moreover, the present inventors envisage a first layer comprising an adhesive and/or a hooks fastener (as typically employed in a hook and loop fastener). In this way, an end effectors comprising a surface against which the adhesive and/or the hooks fastener can operate is able to grasp an item. For example, when employing an adhesive in the first layer 101 and 201 then the end effector may comprise a surface with which the adhesive is known to adhere. Similarly, when a hooks fastener is used in the first layer 101 and 201 then the end effector may comprise the loops part of a hook and loop fastener. In this way, the end effector is able to grasp the item to move it. To remove the item from the end effector comprising a surface and/or a loop fastener then a pull/pushing mechanism may be used to either push the item off of the end effector (such as an ejector pin to apply a pushing force to the item) or to pull the item off using, for example, a robotic hand. In this example, the first layer 101 and 201 may comprise the same materials as the second layer 102 and 202 in that each may comprise the same type of adhesive to thereby adhere to the product and to the surface of the end effector. Similarly, both the first and second layer may comprise the hooks fastener. In this way, the hooks may adhere to a netting of an item and to a loops fastener on the end effector.

In typical robot systems, vision systems are used to identify items to be robotically picked and to identify grasp points at which to grasp the item. It is typically difficult to identify suitable grasp points. Therefore, the present inventors have found that, advantageously, the first layer 101 and 201 may comprise an indicator arranged to indicate to the robot system a grasp point which indicates to grasp the item by the affordance 100 and 200.

In this way, the affordances 100 and 200 provide relatively easy targets for vision systems, thereby simplifying the pick selection process. The vision system can search for the first layer 101 and 201 on the surface of the item that would allow the end effector to grasp the item. For example, the first layer 101 and 201 may comprise a predetermined pattern which would be detected by the vision system as indicative of a grasp point for the item.

The present inventors also considered how to effectively apply the affordance 100 and 200 to each item. For example, the affordance could be applied by a supplier of the item before it is shipped to a customer who will utilise robotic picking. Similarly, the customer could apply affordance 100 and 200 on receipt of an item which will later be robotically picked. In both of these examples, the customer would have to ensure that at least one affordance remains facing a robot system (for example, facing an upwards direction if the robot system is to robotically pick the item from the upwards direction). Otherwise the affordance may be positioned at a location at which the robot system is unable to grasp the affordance, for example, on an underside of an item which may be unreachable by a robot system.

Therefore, the present inventors have advantageously found a means of applying the affordance by way of an end effector, for example, by way of the end effector that will then robotically pick the item.

More specifically, in the example of a suction cup end effector, the suction cup end effector may first grasp an affordance 100 and 200 which is not yet adhered to an item by way of the first layer 101 and 201. The suction cup end effector may then apply the affordance 100 and 200 to a suitable surface of the item by, for example, placing the affordance 100 and 200 on a suitable surface and applying a sufficient pushing force on the affordance 100 and 200 to cause the second layer 102 and 202 to adhere to the surface of the item. Typically, this force need only be applied for ten seconds (for example, although other curing times are possible) after which the second layer 102 and 202 is sufficiently adhered to the surface to permit robotic picking. Thereafter, the suction cup end effector need only move the item because it already grasped the affordance 100 and 200 which in turn is adhered to the item.

Similarly, a parallel jaw end effector may first grasp as affordance 200 by way of a structure 203 on the first layer 201. The parallel jaw end effector may then apply the affordance 200 to a suitable surface of the item, for example, by placing the affordance 200 on a suitable surface and applying a sufficient pushing force on the affordance 200 to cause the second layer 202 to adhere to the surface of the item. Typically, this force need only be applied for ten seconds after which the second layer 202 is sufficiently adhered to the surface to permit robotic picking. Thereafter, the parallel jaw end effector need only move the item because it already grasped the affordance 200 which in turn is adhered to the item.

Moreover, the present inventors have considered certain implementation locations for the above described affordances 100 and 200. For example, the present inventors considered a system comprising a robot system comprising an end effector arranged to grasp at least one item from at least one storage means by way of the affordance. The system also comprises an affordance 100 and 200 as described previously. The affordance may be applied to an item which then in turn may be robotically picked by the robot system.

The present inventors particularly considered the use of such affordances 100 and 200 with order fulfilment system to provide customers with items they have ordered, for example packing items of the order for delivery to the customer. As will be appreciated, items cover a large range of sizes and surfaces finishes. Accordingly the use of a single type of end effector would limit the range of items that could be picked. Accordingly, by application of an affordance 100 and 200 as previously described then the range of items that can be robotically picked by a particular type of end effector can be increased. In one example, the order fulfilment system may be a grocery shopping system arranged to supply food items to a customer where the food items are picked by the robot system. In another example, the order fulfilment system may be an automotive assembly facility arranged to provide an order automobile to a customer using items which are robotically picked.

More specifically, the order fulfilment system may comprise a storage means arranged to store at least one item, for example at least one food item. The order fulfilment system may also comprise a system comprising a robot system comprising an end effector arranged to grasp at least one item from the at least one storage means by way of an affordance 100 and 200 as described previously. The order fulfilment system also comprises an affordance 100 and 200 as described previously. The affordance may be applied to an item which then in turn may be robotically picked by the robot system.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. An affordance for an item to be grasped by a robot system, having an end effector configured to move the item, the affordance comprising:
   a first layer configured to be grasped by a robot end effector; and
   a second layer configured to adhere to an item to be grasped,
   wherein the first layer includes a structure with at least two substantially parallel surfaces.

2. The affordance according to claim 1, wherein the first layer is configured to be grasped by a suction cup end effector.

3. The affordance according to claim 2, wherein the first layer is at least one of flatter or smoother than a surface of the item.

4. The affordance according to claim 3, wherein the first layer is configured to be grasped by a parallel jaw end effector.

5. The affordance according to claim 1, wherein the first layer is at least one of flatter or smoother than a surface of the item.

6. The affordance according to claim 1, wherein the first layer structure is configured to be grasped by a parallel jaw end effector.

7. The affordance according to claim 1, wherein the first layer is configured to be grasped by an end effector having at least two jaws or fingers.

8. The affordance according to claim 1, wherein the first layer comprises:
   at least one of a rigid or semi-rigid material.

9. The affordance according to claim 1, wherein the second layer comprises:
   at least one of an adhesive or hook fastener.

10. The affordance according to claim 1, wherein the second layer is configured to adhere to an item within ten seconds.

11. The affordance according to claim 1, wherein the second layer is configured to be food-safe.

12. The affordance according to claim 1, wherein the affordance is configured to be bio-degradable.

13. The affordance according to claim 1, wherein the first layer comprises:
   an indicator configured to indicate to the robot system to grasp an item by way of the affordance.

14. The affordance according to claim 1, wherein the affordance is configured to be applied to an item by the end effector.

15. A system comprising, in combination:
   an affordance according to claim 1; and
   a robot system having an end effector arranged to grasp at least one item from at least one storage means by way of the affordance.

16. An order fulfilment system comprising, in combination:
   a storage means arranged to store at least one item; and
   a system according to claim 15, wherein the robot system is arranged to grasp at least one item from the storage means by way of the affordance.

17. A method for moving an item, the method comprising:
   applying to the item an affordance having a first layer having a structure with at least two substantially parallel surfaces arranged to be grasped by an end effector of a robot system, and a second layer arranged to adhere to the item; and
   grasping, by the end effector of the robot system, the item by way of the affordance.

18. The method according to claim 17, wherein the affordance is applied to the item by the end effector of the robot system.

* * * * *